(12) United States Patent
Eom et al.

(10) Patent No.: US 9,794,441 B2
(45) Date of Patent: Oct. 17, 2017

(54) ELECTRONIC DEVICE USING COMPOSITION INFORMATION OF PICTURE AND SHOOTING METHOD USING THE SAME

(71) Applicant: Samsung Electronics Co., Ltd., Suwon-si, Gyeonggi-do (KR)

(72) Inventors: Ki Hun Eom, Suwon-si (KR); Young Gwon Koo, Suwon-si (KR); Seong Yeol Kim, Suwon-si (KR); Hyung Wook Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/734,187

(22) Filed: Jun. 9, 2015

(65) Prior Publication Data

US 2015/0358498 A1    Dec. 10, 2015

(30) Foreign Application Priority Data

Jun. 10, 2014 (KR) ........................ 10-2014-0070327

(51) Int. Cl.
  *H04N 5/225* (2006.01)
  *H04N 5/232* (2006.01)
  *H04N 5/272* (2006.01)
  *H04N 1/21* (2006.01)

(52) U.S. Cl.
  CPC ......... *H04N 1/2112* (2013.01); *H04N 5/2251* (2013.01); *H04N 5/23222* (2013.01); *H04N 5/272* (2013.01)

(58) Field of Classification Search
  CPC ............... H04N 1/2112; H04N 5/2251; H04N 5/23222; H04N 5/272
  USPC ................. 348/231.99, 208.99–208.16
  See application file for complete search history.

(56) References Cited

U.S. PATENT DOCUMENTS

| | | | |
|---|---|---|---|
| 5,764,306 A * | 6/1998 | Steffano ................ | H04N 5/272 348/552 |
| 9,106,821 B1 * | 8/2015 | Baldwin ............ | H04N 5/23219 |
| 9,247,129 B1 * | 1/2016 | Gray ........................ | G06T 7/11 |
| 9,596,398 B2 * | 3/2017 | Khawand ............... | H04N 5/232 |
| 2004/0267443 A1 * | 12/2004 | Watanabe ............... | G01C 21/36 701/533 |
| 2008/0218603 A1 * | 9/2008 | Oishi ................. | H04N 1/00132 348/231.99 |
| 2008/0239104 A1 | 10/2008 | Koh | |
| 2009/0079844 A1 * | 3/2009 | Suzuki ................... | G03B 13/36 348/222.1 |

(Continued)

FOREIGN PATENT DOCUMENTS

| | | |
|---|---|---|
| CN | 102946514 A | 2/2013 |
| EP | 2 275 864 A1 | 1/2011 |
| JP | 2014-45404 A | 3/2014 |

*Primary Examiner* — Pritham Prabhakher
(74) *Attorney, Agent, or Firm* — Jefferson IP Law, LLP

(57) ABSTRACT

An electronic device is provided. The electronic device includes a camera module, a memory configured to store reference composition information, and a camera control module configured to collect real-time composition information through the camera module. The camera control module compares the stored reference composition information and the real-time composition information to indicate to a user whether the stored reference composition information and the real-time composition information are consistent with each other.

17 Claims, 8 Drawing Sheets

(56) References Cited

U.S. PATENT DOCUMENTS

| | | |
|---|---|---|
| 2009/0231457 A1 | 9/2009 | Lee et al. |
| 2010/0149398 A1 | 6/2010 | Gayer |
| 2011/0008036 A1 | 1/2011 | Takatsuka et al. |
| 2011/0050976 A1* | 3/2011 | Kwon ............... H04N 5/23293 348/333.04 |
| 2011/0135165 A1* | 6/2011 | Wechsler ............ G06K 9/6228 382/118 |
| 2011/0317031 A1* | 12/2011 | Honda ............... H04N 5/23219 348/229.1 |
| 2012/0169892 A1* | 7/2012 | Numata ............. H04N 5/23254 348/208.4 |
| 2012/0169900 A1* | 7/2012 | Numata ............... H04N 19/433 348/231.99 |
| 2013/0038759 A1 | 2/2013 | Jo et al. |
| 2014/0146191 A1* | 5/2014 | Tsuchiya ............ G02B 27/646 348/208.2 |
| 2014/0253693 A1* | 9/2014 | Shikata ............... H04N 1/2112 348/47 |
| 2014/0267870 A1* | 9/2014 | Liu ....................... H04N 5/272 348/333.05 |
| 2014/0293092 A1* | 10/2014 | Sekine .................. H04N 5/272 348/239 |

* cited by examiner

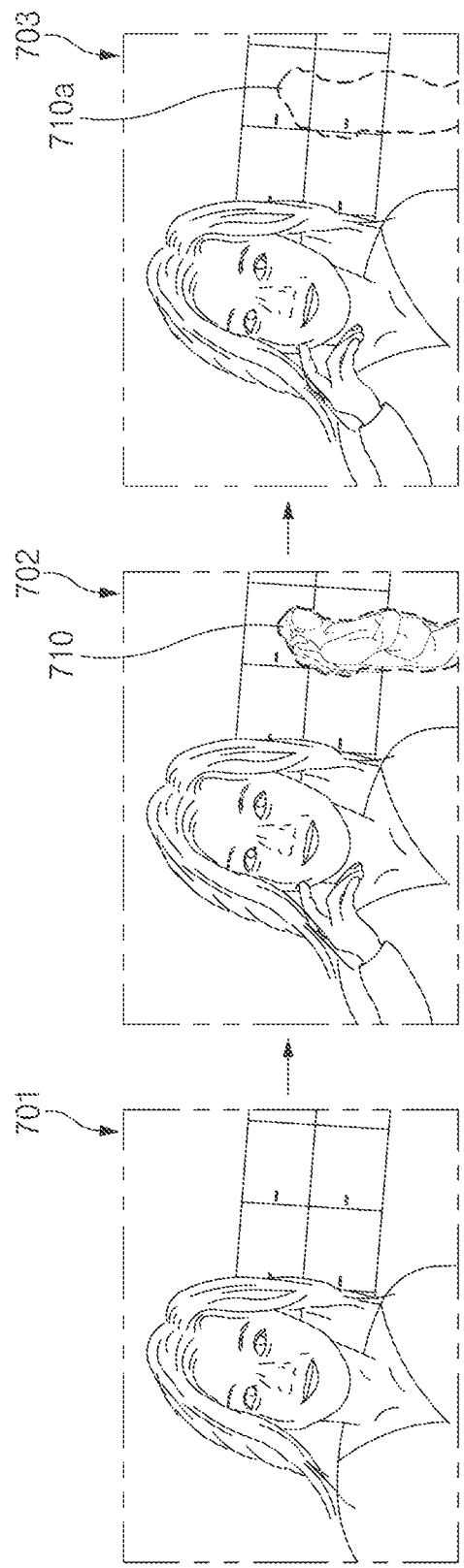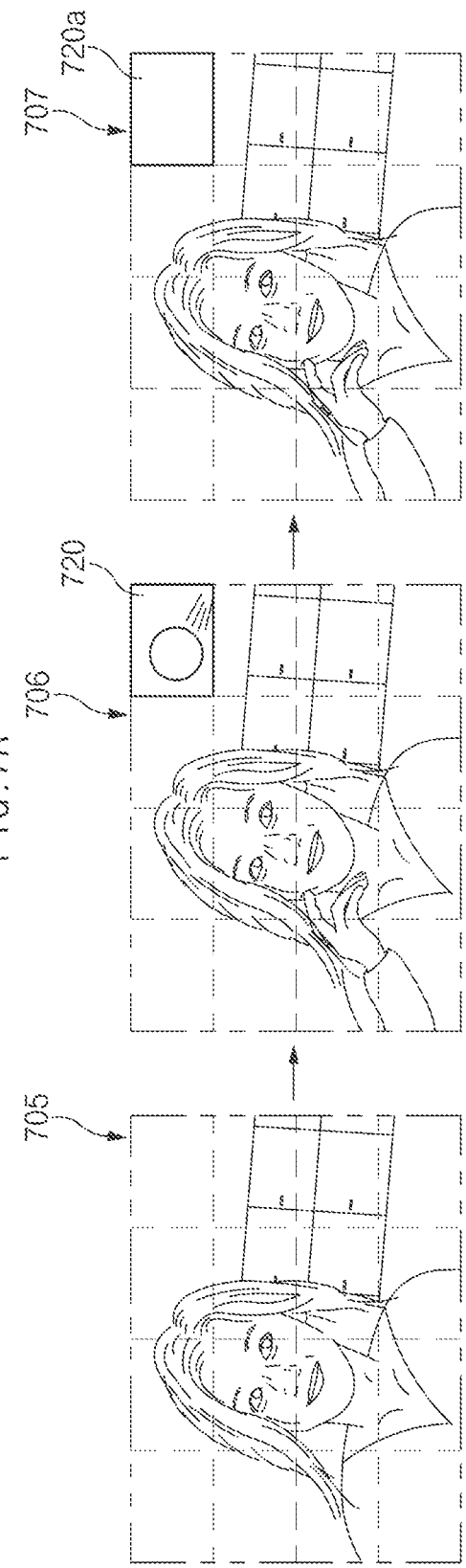
FIG. 7A
FIG. 7B

ELECTRONIC DEVICE USING COMPOSITION INFORMATION OF PICTURE AND SHOOTING METHOD USING THE SAME

CROSS-REFERENCE TO RELATED APPLICATION(S)

This application claims the benefit under 35 U.S.C. §119(a) of a Korean patent application filed on Jun. 10, 2014 in the Korean Intellectual Property Office and assigned Serial number 10-2014-0070327, the entire disclosure of which is hereby incorporated by reference.

TECHNICAL FIELD

The present disclosure relates to an electronic device capable of shooting pictures or videos.

BACKGROUND

With the development of an electronic device, a user may utilize various types of electronic devices (e.g., a smart phone, a tablet, a smart watch, and the like) that are capable of shooting pictures or videos as well as communicating with others. The user may take pictures or videos in various compositions using the electronic device.

In the case where a user takes pictures or videos using the electronic device, a changeable surrounding environment may make it impossible to obtain a picture or a video with a desired composition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, allowing a user to take a picture or a video with a desired composition using composition information stored at the electronic device, and a shooting method using the composition information.

In accordance with an aspect of the present disclosure, an electronic device is provided. The electronic device includes a camera module, a memory configured to store reference composition information, and a camera control module configured to collect real-time composition information through the camera module. The camera control module compares the stored reference composition information and the real-time composition information to indicate to a user whether the stored reference composition information and the real-time composition information coincide with each other.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B illustrate a method for editing a picture using composition information according to various embodiments of the present disclosure.

Throughout the drawings, it should be noted that like reference numbers are used to depict the same or similar elements, features, and structures.

DETAILED DESCRIPTION

Figure 1:
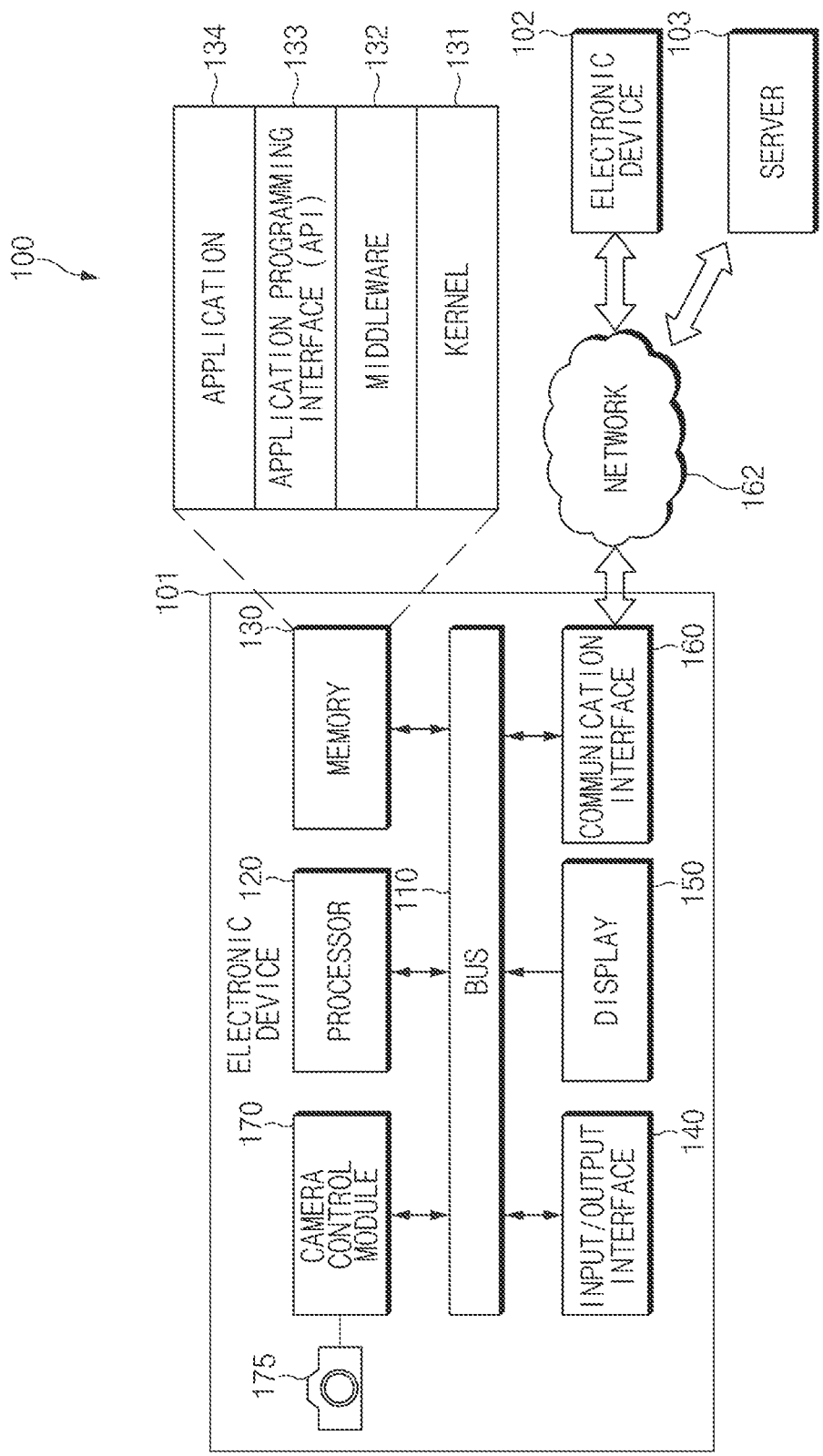
FIG. 1 is a diagram illustrating a network environment of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure may include a metal case. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like.

According to various embodiments of the present disclosure, the electronic devices may be smart home appliances including metal cases. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, and the like.

According to various embodiments of the present disclosure, the electronic devices may include at least one of medical devices (e.g., a magnetic resonance angiography (MRA), a magnetic resonance imaging (MRI), a computed tomography (CT), scanners, and ultrasonic devices), navigation devices, GPS receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs) including metal cases.

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, and wave meters) including metal cases. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating a network environment of an electronic device according to various embodiments of the present disclosure.

Referring to FIG. 1, an electronic device 101, in a network environment 100, may include a bus 110, a processor 120, a memory 130, an input/output interface 140, a display 150, a communication interface 160, a camera module 175, and a camera control module 170.

The bus 110 may interconnect the above-described components and may be a circuit for conveying communications (e.g., a control message) among the above-described components.

The processor 120 may receive, for example, instructions from the above-described other components (e.g., the memory 130, the input/output interface 140, the display 150, the communication interface 160, the camera control module 170, and the like) through the bus 110, may decode the received instructions, and may perform data processing or operations according to the decoded instructions.

The memory 130 may store instructions or data received from the processor 120 or other components (e.g., the input/output interface 140, the display 150, the communication interface 160, the camera control module 170, and the like) or generated by the processor 120 or the other components.

According to various embodiments of the present disclosure, the memory 130 may store composition information that the camera control module 170 utilizes. The composition information may correspond to information associated with a condition for determining a composition of a picture or video. The composition information may include information associated with a movement direction, e.g., a tilt, an azimuth, and the like recognized through various sensors of an electronic device 101, information associated with a state of an electronic device, digital image information e.g., information associated with brightness and chroma of a specific point in an image, included in a specific image, and the like. A user may take a picture or video, which is consistent with (or analogous to) a relevant composition, using the stored composition information.

According to various embodiments of the present disclosure, the memory 130 may include, for example, programming modules such as a kernel 131, a middleware 132, an application processing interface (API) 133, an application 134, and the like. Each of the above-described programming modules may be implemented in the form of software, firmware, hardware, or a combination of at least two thereof.

The kernel 131 may control or manage system resources (e.g., the bus 110, the processor 120, the memory 130, and the like) that are used to execute operations or functions of remaining other programming modules, for example, the middleware 132, the API 133, or the application 134. Furthermore, the kernel 131 may provide an interface that allows the middleware 132, the API 133, or the application 134 to access discrete components of the electronic device 101 so as to control or manage the middleware 132, the API 133, or the application 134.

The middleware 132 may perform a mediation role such that the API 133 or the application 134 communicates with the kernel 131 to exchange data. Furthermore, with regard to task requests received from the application 134, for example, the middleware 132 may perform a control (e.g., scheduling or load balancing) on a task request using a method of assigning the priority, which makes it possible to use a system resource (e.g., the bus 110, the processor 120, the memory 130, or the like) of the electronic device 101, to the at least one application 134.

The API 133 may be an interface through which the application 134 controls a function provided by the kernel 131 or the middleware 132, and may include, for example, at least one interface or function (e.g., an instruction) for a file control, a window control, image processing, a character control, or the like.

According to various embodiments of the present disclosure, the application 134 may include a short messaging service/multimedia messaging service (SMS/MMS) application, an e-mail application, a calendar application, an alarm application, a health care application (e.g., an application for measuring an exercise amount, a blood sugar, etc.), an environment information application (e.g., an application for providing air pressure, humidity, temperature information, etc.), or the like. Additionally or generally, the application 134 may be an application associated with information exchange between the electronic device 101 and an external electronic device (e.g., an electronic device 102 or a sever 103). The application associated with information exchange may include, for example, a notification relay application for transmitting specific information to an external electronic device or a device management application for managing an external electronic device.

For example, a notification relay application may include a function for providing an external electronic device (e.g., an electronic device 102 or a server 103) with notification information generated from another application (e.g., a message application, an e-mail application, a health care application, an environment information application, or the like) of the electronic device 101. Additionally, the notification relay application, for example, may receive notification information from an external electronic device (e.g., an electronic device 102 or a server 103) and may provide it to a user. The device management application may manage (e.g., install, delete, or update), for example, a function (e.g., turn on/turn off of an external electronic device itself, or a portion of a constituent part, control of brightness or resolution of a screen) of at least a portion of the external electronic device (e.g., an electronic device 102 or a server 103) communicating with the electronic device 101, an application operating on the external electronic device 102 or server 103, or a service (e.g., a communication, or telephone, service or a message service provided by the external electronic device 102 or server 103.

The application 134 may include an application that is designated according to an attribute (e.g., the kind of electronic device) of the external electronic device (e.g., an electronic device 102 or a server 103). For example, in the case where the external electronic device 102 is an MP3 player, the application 134 may include an application associated with music reproduction. Similarly, in the case that the external electronic device 102 is a mobile medical device, the application 134 may include an application associated with health care. According to an embodiment of the present disclosure, the application 134 may include at least one of an application designated to the electronic device 101, or an application received from the external electronic device (e.g., an electronic device 102 or a server 103).

The I/O interface 140 may transmit an instruction or data, input from a user through an input/output device (e.g., a sensor, a keyboard, or a touch screen), to the processor 120, the memory 130, the communication interface 160, or the camera control module 170, for example, through the bus 110. For example, the I/O interface 140 may provide the processor 120 with a user's touch data input through a touch screen. Furthermore, the I/O interface 140 may output an instruction or data, received from the processor 120, the memory 130, the communication interface 160, or the camera control module 170 through the bus 110, through the input/output device (e.g., a speaker or a display). The I/O interface 140 may, for example, output voice data processed through the processor 120 to the user through a speaker.

The display 150 may display a variety of information (e.g., multimedia data, text data, and the like) for the user. According to various embodiments of the present disclosure, the display may present an image captured by a camera module 175. A user may check the captured image and may shoot a picture or a video.

The communication interface 160 may establish communication between the electronic device 101 and an external electronic device 102, 103. For example, the communication interface 160 may be connected to a network 162 through wireless communication or wired communication to communicate with the external electronic device 102, 103. The wireless communication may include at least one of, for example, wireless-fidelity (Wi-Fi), Bluetooth (BT), near field communication (NFC), GPS, or cellular communication (e.g., 3G, LTE, LTE-A, CDMA, WCDMA, UMTs, WiBro, GSM, or the like). The wired communication may include at least one of, for example, a universal serial bus (USB), a high definition multimedia interface (HDMI), a recommended standard-232 (RS-232), or a plain old telephone service (POTS).

According to an embodiment of the present disclosure, the network 162 may be a telecommunications network. The telecommunications network may include at least one of a computer network, an internet, an internet of things, or a telephone network. A protocol (e.g., a transport layer protocol, a data link layer protocol, or a physical layer protocol) for communication between the electronic device 101 and an external device 102, or server 103, may be supported by at least one of the kernel 131, the middleware 132, the application programming interface 133, the application 134, or the communication interface 160.

The camera control module 170 may control the camera module 175. The camera control module 170 may determine whether composition information stored at the memory 130 is consistent with (or analogous to) composition information of an image currently captured through the camera module 175. In the case where current composition information is consistent with the stored composition information, the camera control module 170 may notify a user that compositions corresponds to each other, so as to start shooting or to automatically take a picture or video in a consistent composition.

For example, a user may capture a desired composition using a camera disposed at a front surface of the electronic device 101. The camera control module 170 may extract and store composition information from the captured picture. In the case where a user starts to shoot a selfie, for example, through a camera, disposed at a rear surface of the electronic device 101, using the stored composition information, the camera control module 170 may compare an image captured in real time through a rear camera with the stored composition information to continuously notify a user whether compositions correspond to each other. The user may gradually adjust a composition, and the camera control module 170 may inform a user to start to take a picture or video when a real-time composition is consistent with (or analogous to) the stored composition. The user may take a picture of a desired composition through the rear camera, of which the performance is higher than that of a front camera, and thus, may obtain a high-quality selfie, for example, with high resolution. It should be noted that a selfie as used herein, may include the taking of a picture of oneself or more than one person including the user, by the user. Although, a selfie has been used as an example in the disclosed embodiment, other uses for the camera control module exist.

In FIG. 1, the camera control module 170 may be exemplarily illustrated as being separate from the processor 120, but the present disclosure may not be limited thereto. For example, the camera control module 170 may be included in the processor 120 in the form of a module. Alternatively, the processor 120 may directly control the camera module 175.

The camera module 175 may take a picture or video in response to a control from the camera control module 170. The camera module 175 may include a lens, an optical device, a flash device, and the like, to take a picture or video. Below, the present disclosure will be described using the case that a picture is captured through the camera module 175, but the scope and spirit of the present disclosure may not be limited thereto. For example, the present disclosure may be applicable to video shooting as well.

In FIG. 1, the camera module 175 may be exemplarily illustrated as being directly connected to the camera control module 170 and controlled thereby, but the scope and spirit of the present disclosure may not be limited thereto. For example, the camera module 175 may be coupled to the bus 110 for connection with other components (e.g., the memory 130, the input/output interface 140, the display 150, the communication interface 160, the camera control module 170, and the like).

According to various embodiments of the present disclosure, the camera module 175 may be in plurality. For example, the camera module 175 may include a first camera module disposed at a front surface (e.g., the same surface as a surface where a display 150 is disposed) of the electronic device 101 and a second camera module disposed at a rear surface of the electronic device 101. The camera control module 170 may collect and use information associated with a composition from images respectively captured by the first and second camera modules of the camera module 175. Information associated with a shooting method using a plurality of camera modules will be given through FIGS. 3A to 7B.

Figure 2:
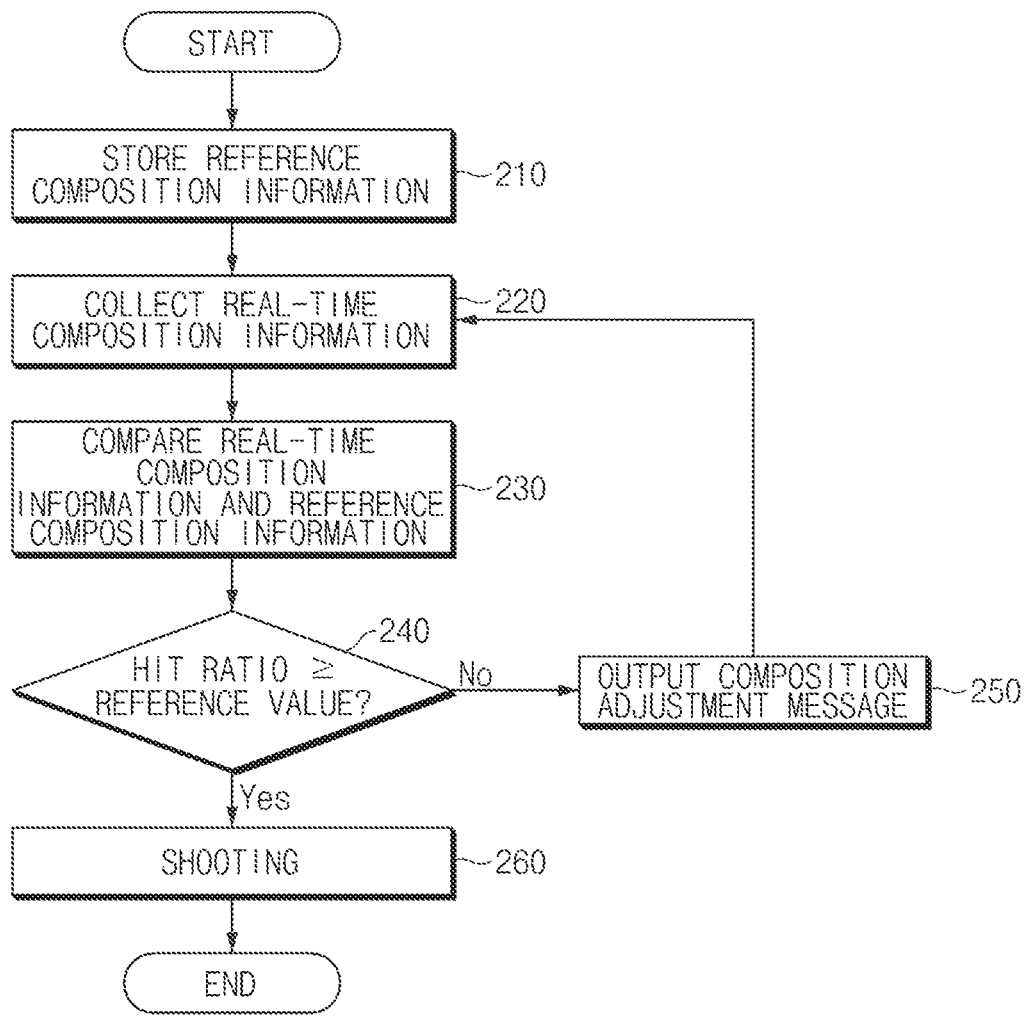
FIG. 2 is a flowchart associated with a shooting method using stored composition information according to various embodiments of the present disclosure.

FIG. 2 is a flowchart associated with a shooting method using stored composition information according to various embodiments of the present disclosure.

Referring to FIG. 2, in operation 210, a memory 130 may store reference composition information. The reference composition information may be information associated with a condition for deciding a composition of a picture and may include information associated with a movement direction, a tilt, an azimuth, and the like, recognized through various sensors of an electronic device 101, information associated with a state of an electronic device 101, digital image information, for example, information associated with brightness, chroma, and the like of a designated point in an image included in a designated image, and the like. A user may take a picture or video, which coincides with a relevant composition, using the stored composition information. According to various embodiments of the present disclosure, a user may select at least one of the stored reference composition information and may take a picture corresponding to the selected composition.

The reference composition information may be previously stored at the memory 130 by a manufacturing company or a service provider. The manufacturing company or the service provider may store various kinds of composition information at the electronic device 101 to allow the user to selectively take a picture in various compositions. According to various embodiments of the present disclosure, the reference composition information may be downloaded from an external device (e.g., an electronic device 102 or a server 103) through a network 162.

The reference composition information may include digital image information (e.g., information associated with brightness, chroma, and the like of a designated point in a selected picture) extracted from a picture selected by a user. The picture may be directly taken through the camera module included in the electronic device 101 or may be downloaded from an external device, e.g., an electronic device 102 or a server 103). According to various embodiments of the present disclosure, the reference composition information may include image information on a portion of a specific picture. For example, the reference composition information may include image information on a background portion, not including a face portion of a person, of the specific picture. In this case, the user may take a picture of which the background is consistent with (or analogous to) that of a picture from which the reference composition information is extracted.

Referring back to FIG. 2, in operation 220, the camera control module 170 may collect real-time composition information. The real-time composition information may be composition information on an image that is being captured through a camera module 175 at the present time. The real-time composition information may include at least a portion of items included in the reference composition information. For example, the real-time composition information may include at least a portion of information associated with a state of an electronic device, for example, information associated with a movement direction, a tilt, an azimuth, and the like recognized through various sensors of an electronic device 101, or digital image information, e.g., information associated with brightness, chroma, and the like of a designated point in an image included in a designated image.

In operation 230, the camera control module 170 may compare the collected real-time composition information with the reference composition information read out from the memory 130. The camera control module may determine a hit ratio of the real-time composition information to the reference composition information, based on the comparison result. The hit ratio may be determined by checking whether corresponding items in common in the real-time composition information and the reference composition information are consistent with each other. For example, in the case where a tilt of the electronic device 101 included in the reference composition information is 5 degrees, the camera control module 170 may determine tilt items as being consistent with each other, when a tilt of the electronic device 101 included in the real-time composition information is between 4.9 is 5.1 degree.

In operation 240, the camera control module 170 may check whether the hit ratio is greater than or equal to (or, greater than) a reference value. The reference value may be predetermined or may be determined by a user. For example, in the case where the reference value is previously set to 80%, the camera control module 170 may determine whether a hit ratio of the real-time composition information to the reference composition information is greater than or equal to 80%.

According to various embodiments of the present disclosure, the reference value may be set to a value that is variable according to a specific algorithm. For example, in the case where average brightness of an image is smaller than or equal to a specific value, the reference value may be set to a relatively small value (e.g., 60%), and in the case where the average brightness of an image is greater than or equal to the specific value, the reference value may be set to a relatively great value (e.g., 90%).

In operation 250, in the case where the hit ratio is smaller than (or, smaller than or equal to) the reference value, the camera control module 170 may output a composition adjustment message. The composition adjustment message may be a guide message that allows a user to change a composition through notification. The composition adjustment message may also be output in various forms that a user can recognize. For example, the composition adjustment message may be output through a guide voice (e.g., a voice output: "move to the right"), vibration, LED (e.g., adjusting vibration intensity or LED brightness based on a hit ratio), and the like.

The composition adjustment message may allow a user to adjust a composition without checking an image in the case where the user cannot check the image, currently captured using a camera module, through a display 150 (e.g., in the case of taking a selfie using a rear camera of an electronic device 101). The user may change a composition by changing a state of the electronic device 101 (e.g., a tilt variation or a position variation of an electronic device 101) or a position on a surrounding object or a user him/herself, based on the composition adjustment message. When the real-time composition information is changed according to the composition adjustment message, the camera control module 170 may continuously determine whether the reference composition information is consistent with (or analogous to) the changed real-time composition information.

In operation 260, the camera control module 170 may take a picture or video when the hit ratio is greater than or equal to the reference value. According to various embodiments of the present disclosure, the camera control module 170 may notify a user that compositions are consistent with each other, and thus, a user may start to take a picture or video (e.g., outputting a composition hit message) or shooting may be automatically performed.

Figure 3A:
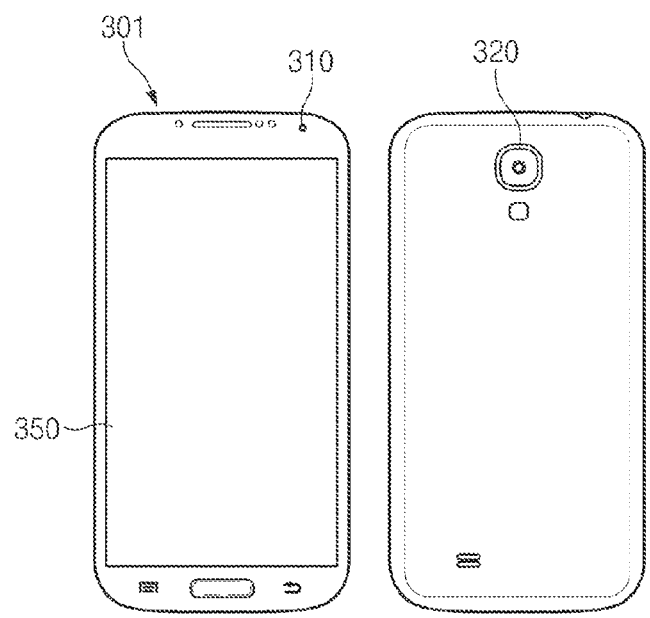
FIGS. 3A and 3B illustrate an electronic device including a plurality of camera modules according to various embodiments of the present disclosure.
Figure 3B:
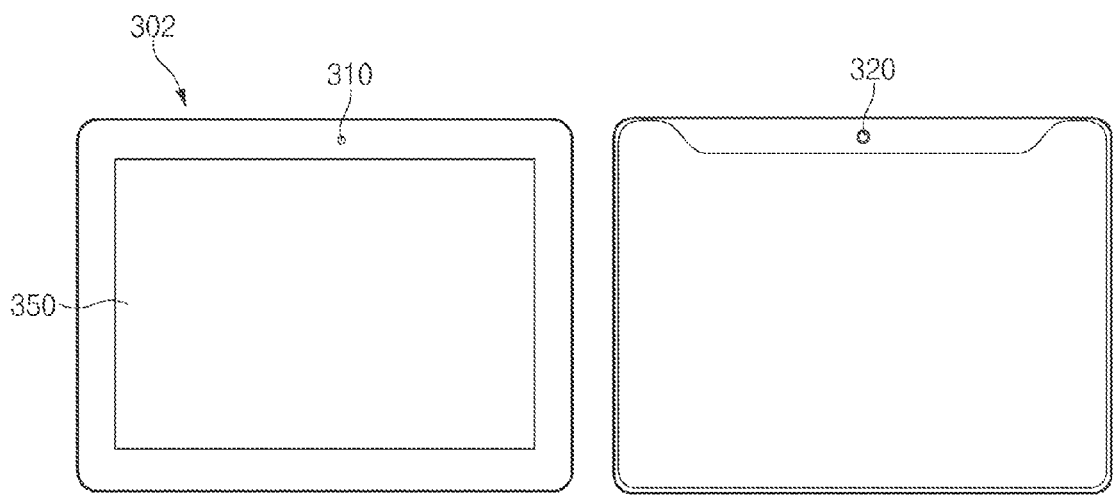

FIG. 3A illustrates a smart phone including a plurality of camera modules, and FIG. 3B illustrates a tablet PC including a plurality of camera modules, according to various embodiments of the present disclosure.

Referring to FIGS. 3A and 3B, an electronic device 301 or 302 may include a first camera module 310 and a second camera module 320. In FIG. 3A, the electronic device 301 and 302 may be illustrated as including two camera modules, but the scope and spirit of the present disclosure may not be limited thereto. For example, the present disclosure may be applicable to the case where the electronic device 301 or 302 includes three or more camera modules.

The first camera module 310 may be a camera module disposed at a front surface, the surface where a display 350 is disposed, of the electronic device 301, 302. The first camera module 310 may be used for video communication or a selfie. A user may shoot a selfie using the first camera module 310 while checking her/his current state through the display 350. In general, the first camera module 310 may be frequently used as a sub camera of which the performance is lower than that of the second camera module 320, thereby making it difficult to obtain a high-quality picture through the first camera module 310.

The second camera module 320 may be a camera module disposed at a rear surface of the electronic device 301 or 302. The second camera module 320 may be a main camera of which the performance is higher than that of the first camera module 310. The user may grasp the electronic device 301 or 302 such that the display 340 faces him/her, and may shoot an object through the second camera module 320 while checking a displayed image. As for the first camera module 310, the second camera module 320 may be used to obtain a selfie, but since the second camera module 320 is disposed in a direction different from the display 350, the user may not take a picture or video while checking his/her current state.

According to various embodiments of the present disclosure, the camera control module 170 may control a plurality of camera modules (e.g., a first camera module 310 and a second camera module 320) to capture a picture of which the composition is consistent with (or analogous to) a specific composition. For example, the camera control module 170 may take a first picture through the first camera module 310 and may extract or store composition information associated with the first picture. The camera control module 170 may take, through the second camera 320, a second picture of which the quality is high and of which the composition is consistent with that of the first picture. Below, a shooting method using a plurality of camera modules will be more fully described with reference to accompanying drawings.

Figure 4:
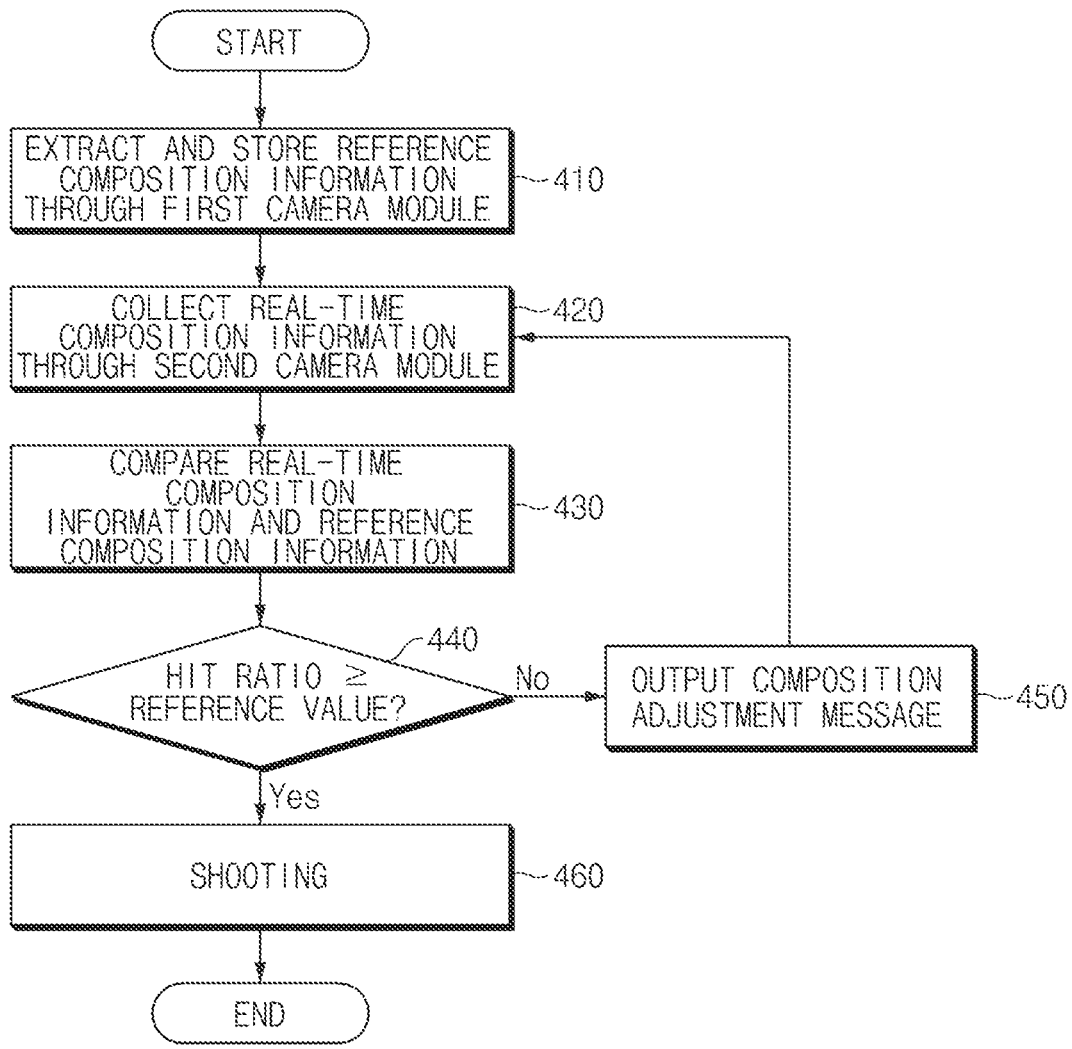
FIG. 4 is a flowchart schematically illustrating a shooting method using a plurality of camera modules according to various embodiments of the present disclosure.

FIG. 4 is a flowchart illustrating a shooting method using a plurality of camera modules according to various embodiments of the present disclosure.

Referring to FIG. 4, in operation 410, a camera control module 170 may extract and store reference composition information through a first camera module 310. The camera control module 170 may store a picture (hereinafter referred to a first picture) captured through the first camera module 310 or composition information associated with the captured picture (the first picture). For example, the camera control module 170 may store information associated with a movement direction, a tilt, an azimuth, and the like, recognized through various sensors of an electronic device 101, information associated with a state of an electronic device 101 when the first picture is captured, together with, or independent of, image information of the first picture. Alternatively, the camera control module may store digital image information (e.g., information associated with the brightness, chroma, and the like of a designated point in a first picture) included in the first picture, together with, or independent of, image information of the first picture.

According to various embodiments of the present disclosure, the camera control module 170 may store reference composition information associated with the first picture at a temporary buffer, and after using the reference composition information in taking a picture/video through a second camera module 320, the camera control module 170 may remove the reference composition information or may allow a user to check whether to store the reference composition information separately.

In operation 420, the camera control module 170 may collect real-time composition information through the second camera module 320. The real-time composition information may be composition information on an image captured through the second camera module 320 at a present time. According to various embodiments of the present disclosure, the camera control module 170 may inactivate the first camera module 310 while the second camera module 320 is in use.

In operation 430, the camera control module 170 may compare the collected real-time composition information with reference composition information associated with the first picture. The camera control module 170 may decide a hit ratio of the real-time composition information to the reference composition information based on the comparison result. According to various embodiments of the present disclosure, the camera control module 170 may determine whether compositions are consistent with each other, based on a numerical value, a device characteristic of the electronic device 101, or a characteristic where composition information is respectively collected. For example, in the case where the reference composition information is collected through the first camera module 310 and the real-time composition information is collected through the second camera module 320, the camera control module 170 may determine a tilt of a front direction of 5 degrees included in the reference composition information as being consistent with a tilt of a rear direction of 5 degrees included in the real-time composition information. The camera control module 170 may reflect an actual tilt of the electronic device 101 on a user basis to determine whether or not of composition information.

In operation 440, the camera control module 170 may determine whether the hit ratio is greater than or equal to (or greater than) a reference value. The reference value may be predetermined or may be set by a user.

In operation 450, in the case where the hit ratio is smaller than (or smaller than or equal to) the reference value, the camera control module 170 may output a composition adjustment message. The composition adjustment message may be a message for guiding a user to change a shooting composition. The composition adjustment message may be output in various forms, such as a guide voice, vibration, LED, and the like, that a user can recognize. After outputting the composition adjustment message, the camera control module 170 may continue to collect the real-time composition information and may compare the collected real-time composition information with the reference composition information.

In the case where the hit ratio is greater than or equal to the reference value, in operation 460, the camera control module 170 may take a picture. According to various embodiments of the present disclosure, the camera control module 170 may notify a user that compositions are consistent with (or analogous to) each other, so as to start shooting or to automatically take a picture or video in a matched composition.

According to various embodiments of the present disclosure, a shooting method executed at an electronic device may include storing reference composition information at a memory, collecting real-time composition information through a camera module, comparing the real-time composition information with the reference composition information, and providing whether the real-time composition information and the reference composition information are consistent with each other, based on the comparison result. The storing of reference composition information may include extracting reference composition information from a picture or video captured through a sub camera module independently of the camera module and storing the extracted reference composition information at the memory.

According to various embodiments of the present disclosure, the providing may include outputting a composition hit message or performing automatic shooting, in the case where a hit ratio of the real-time composition information to the reference composition information is greater than or equal to a reference value. The providing may include outputting a composition adjustment message in the case where a hit ratio of the real-time composition information to the reference composition information is smaller than a reference value.

Figure 5A:
FIGS. 5A, 5B, and 5C illustrate a self-shot method using a plurality of camera modules according to various embodiments of the present disclosure.
Figure 5B:
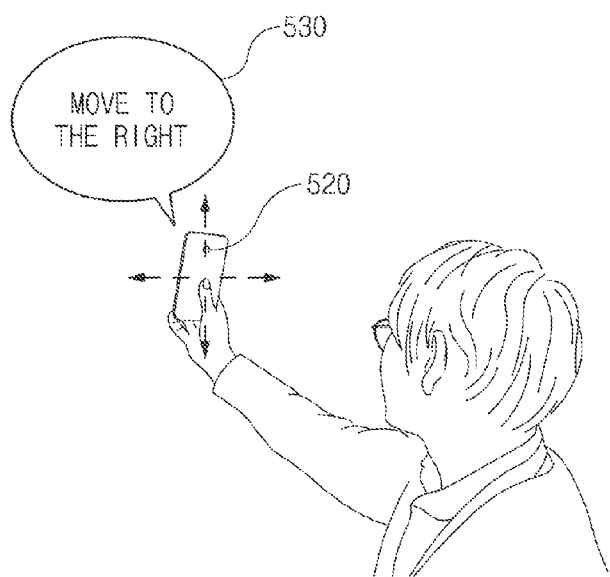
Figure 5C:

FIGS. 5A, 5B, and 5C illustrate a selfie-shot taking method using a plurality of camera modules according to various embodiments of the present disclosure.

Referring to FIG. 5A, a user may take a first picture through a first camera module 510. The user may take the first picture while checking him/herself and a shooting composition through a display 550. A camera control module 170 may extract and store reference composition information associated with the first picture. Afterwards, the user may take a second picture, of which the composition information is consistent with that of the first picture, using the stored reference composition information.

Referring to FIG. 5B, the user may start to take the second picture through a second camera module 520. The camera control module 170 may collect real-time composition information on an image captured through the second camera module 520. The camera control module 170 may collect information (e.g., a tilt of a device itself, an azimuth, information recognized through various sensors, and the like) associated with a state of an electronic device, digital image information (e.g., information associated with brightness, chroma, and the like of a designated point in the first picture).

The camera control module 170 may compare the collected real-time composition information with the reference composition information associated with the first picture. In the case where a hit ratio is smaller than (or smaller than or equal to) a reference value, the camera control module 170 may output a composition adjustment message 530, e.g. "move to the right". The composition adjustment message 530 may be a guide message that allows a user to change a composition. In FIG. 5B, an embodiment of the present disclosure is exemplified as the composition adjustment message 530 is voice guidance, but the scope and spirit of the present disclosure may not be limited thereto. For example, the composition adjustment message 530 may be output in various manners using vibration, LED (e.g., adjusting vibration intensity or LED brightness based on a hit ratio), and the like.

In the case where the real-time composition information is not consistent with the reference composition information, the camera control module 170 may output the composition adjustment message 530 continuously (or every specific time interval). The user may adjust his/her position or a position of an electronic device 101 based on an indication of the composition adjustment message 530, thereby allowing a composition to become consistent with the composition of the first picture gradually.

Referring to FIG. 5C, when adjustment of a composition according to the composition adjustment message is completed by the user, the camera control module 170 may notify the user that the composition is consistent with that of the first picture, and the user may start shooting. According to various embodiments of the present disclosure, in the case where a hit ratio is greater than or equal to the reference value, the camera control module 170 may be set to perform shooting automatically through the second camera module 520.

Figures 6A, 6B, 6C:
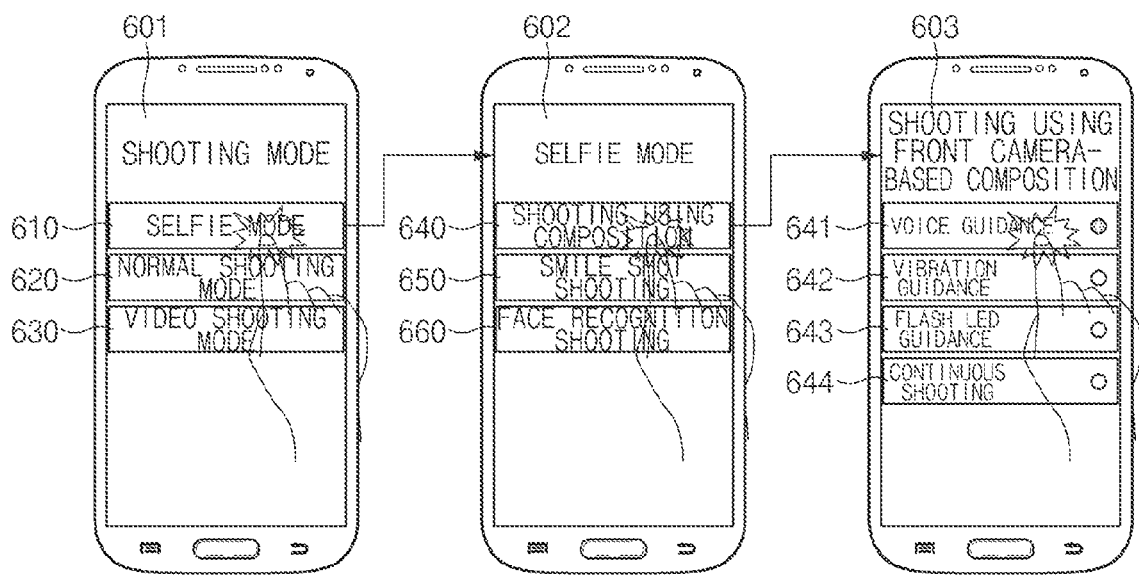
FIGS. 6A, 6B, and 6C illustrate a screen configuration for shooting using composition information according to various embodiments of the present disclosure.

FIGS. 6A, 6B, and 6C illustrate a screen configuration for shooting using composition information according to various embodiments of the present disclosure. The screen configuration illustrated in FIGS. 6A, 6B and 6C may be merely exemplary, and may be implemented in various shapes.

Referring to a screen 601, illustrated in FIG. 6A, an electronic device may display a selfie mode 610, a normal shooting mode 620, a video shooting mode 630, and the like on a display. The electronic device may configure a screen including the selfie mode 610 of various shooting modes using a camera, thereby allowing a user to use a selfie function conveniently.

Referring to a screen 602, illustrated in FIG. 6B, when the selfie mode 610 is selected, the electronic device 101 may display various modes for obtaining a selfie. For example, the electronic device 101 may display various selfie modes such as composition use shooting 640 that uses composition information of a first and/or second camera module, smile shot shooting 650 for recognizing a smiling face to automatically take a picture, and face recognition shooting 660 for recognizing and taking a face portion of a user, and the like.

Referring to a screen 603, illustrated in FIG. 6C, when the composition using shooting 640 is selected, the electronic device 101 may display the type of composition adjustment message or an auto shooting manner. For example, the electronic device 101 may provide voice guidance 641, vibration guidance 642, flash LED guidance 643, and continuous shooting 644. The voice guidance 641 may be a mode in which a voice such as "Move to the right" is output during shooting. The vibration guidance 642 or the flash LED guidance 643 may be a mode in which vibration intensity or LED brightness, respectively, is adjusted according to a hit ratio. The continuous shooting 644 may be a mode in which images are continuously taken up to a specific number of images, when a hit ratio between the real-time composition information and the reference composition information is greater than or equal to a reference value. When an output type of a composition adjustment message, or a shooting type, is selected by a user, the electronic device 101 may begin shooting to collect reference composition information using the activated first camera module.

FIGS. 7A and 7B illustrate a method for editing a picture using composition information according to various embodiments of the present disclosure.

Referring to FIG. 7A, a camera control module may provide a user with a picture 703 that is obtained by replacing a portion of a second picture 702 with a portion of a first picture 701. In the case where an unnecessary subject 710 (e.g., a passerby or an object) is included in the second picture 702, the camera control module may provide a user with the picture 703 from which the subject 710 is removed.

For example, after taking the first picture 701 using the first camera module, the user may take the second picture 702 through a second camera module using reference composition information extracted from the first picture 701. In the case where a subject 710 (e.g., a passerby or an object) that a user does not predict is included in the second picture 702, the camera control module may collect data on a background portion in which the subject 710 is removed from the first picture 701, to replace the subject 710 included in the second picture 702. As a result, the user may obtain a picture 703 from which the subject 710 is removed from the second picture 702.

Referring to FIG. 7B, the camera control module may divide the first picture 705 or the second picture 706 with the same composition information into several sectors or grids and replace the corresponding sector or grid.

For example, in the case where an object that a user does not predict is included in the second picture 706, for example, in the case where during taking the second picture 706, a vehicle passes or a soccer ball flies through, the camera control module may provide the user with a picture 707 that is edited by replacing a sector 720, which includes an unnecessary object, with a corresponding portion 720a from the first picture 705.

According to various embodiments of the present disclosure, in the case where composition information is applied to a video, the camera control module may extract and store composition information from the video paused (or a specific paused image) and may take a video with the same composition using the stored composition information. A user may take a video partially and may continue to take a video of which the composition is consistent with that of a paused portion of the video (or a specific paused image).

Figure 8:
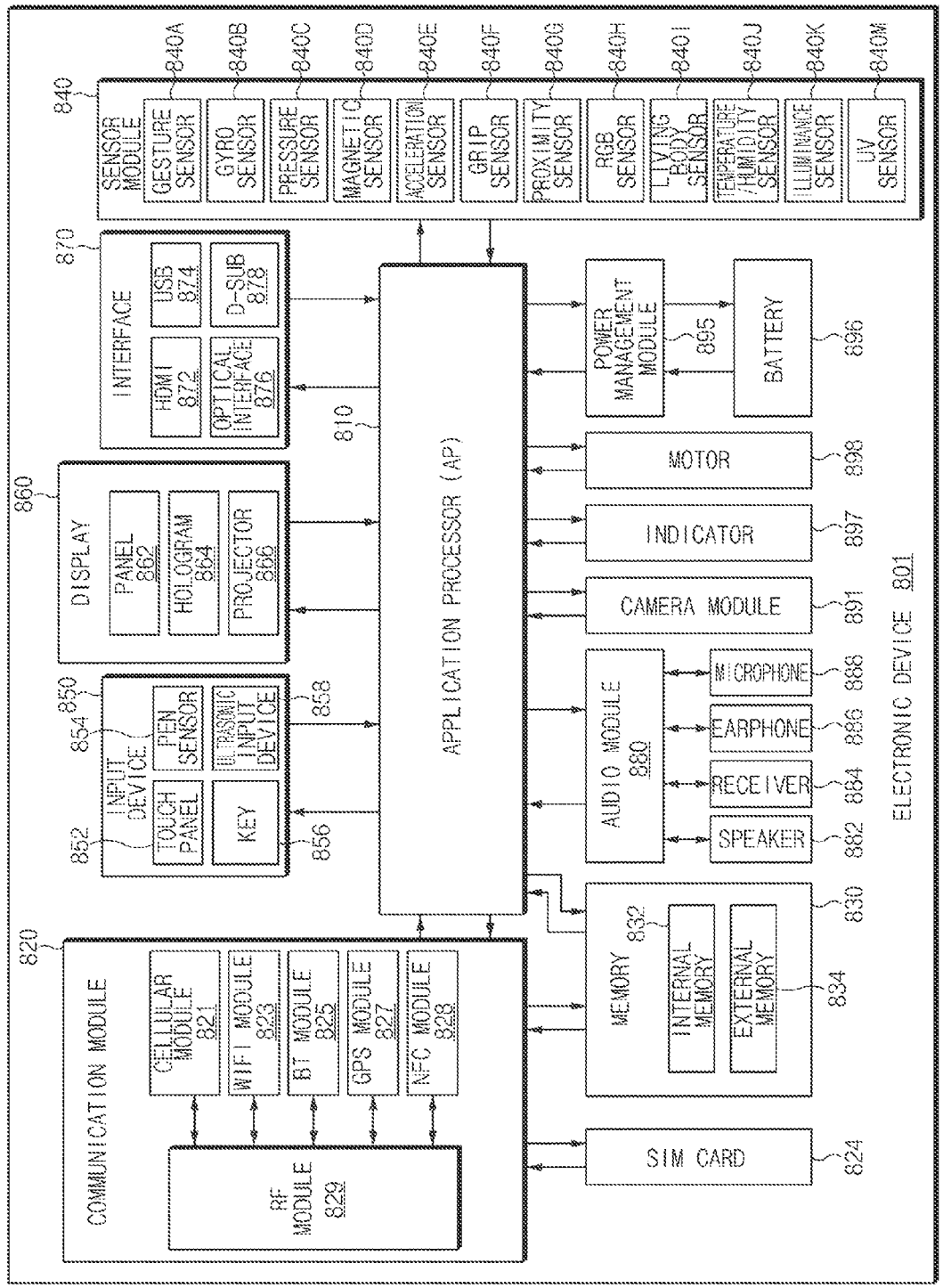
FIG. 8 is a block diagram illustrating an electronic device according to various embodiments of the present disclosure.

FIG. 8 is a block diagram illustrating an electronic device 801 according to various embodiments of the present disclosure.

Referring to FIG. 8, the electronic device 801 may include one or more application processors (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may drive an operating system (OS) or an application to control a plurality of hardware or software components connected to the AP 810 and may process and compute a variety of data including multimedia data. The AP 810 may be implemented with a System on Chip (SoC), for example. According to an embodiment, the AP 810 may further include a graphic processing unit (GPU) (not illustrated).

The communication module 820 (e.g., the communication interface 160, illustrated in FIG. 1) may transmit and receive data when there are conveyed communications between other electronic devices connected with the electronic device 801 through a network. According to an embodiment of the present disclosure, the communication module 820 may include a cellular module 821, a wireless-fidelity (Wi-Fi) module 823, a Bluetooth (BT) module 825, a global positioning system (GPS) module 827, a near field communication (NFC) module 828, and a radio frequency (RF) module 829.

The cellular module 821 may provide voice communication, video communication, a character service, an Internet service or the like through a communication network (e.g., an LTE, an LTE-A, a CDMA, a WCDMA, a UMTS, a WiBro, a GSM, or the like). Also, the cellular module 821 may perform discrimination and authentication of an electronic device within a communication network using a subscriber identification module (e.g., a SIM card 824), for example. According to an embodiment of the present disclosure, the cellular module 821 may perform at least a portion of functions that the AP 810 provides. For example, the cellular module 821 may perform at least a portion of a multimedia control function.

According to an embodiment of the present disclosure, the cellular module 821 may include a communication processor (CP). Also, the cellular module 821 may be implemented with, for example, a SoC. Although components such as the cellular module 821 (e.g., a communication processor), the memory 830, the power management module 895, and the like are illustrated as being components independent of the AP 810, the AP 810 may be implemented to include at least a portion (e.g., a cellular module 821) of the above components.

According to an embodiment of the present disclosure, the AP 810 or the cellular module 821 (e.g., a communication processor) may load and process an instruction or data received from nonvolatile memories respectively connected thereto or from at least one of other elements at the nonvolatile memory. Also, the AP 810 or the cellular module 821 may store data received from at least one of the other elements or generated by at least one of the other elements at a nonvolatile memory.

Each of the Wi-Fi module 823, the BT module 825, the GPS module 827, and the NFC module 828 may include a processor for processing data exchanged through a corresponding module, for example. In FIG. 8, an embodiment of the present disclosure is exemplified as the cellular module 821, the Wi-Fi module 823, the BT module 825, the GPS module 827, and the NFC module 828 are separate blocks, respectively. According to an embodiment of the present disclosure, at least a portion (e.g., two or more components) of the cellular module 821, the Wi-Fi module 823, the BT module 825, the GPS module 827, and the NFC module 828 may be included within one Integrated Circuit (IC) or an IC package. For example, at least a portion (e.g., a communication processor corresponding to the cellular module 821 and a Wi-Fi processor corresponding to the Wi-Fi module 823) of communication processors corresponding to the cellular module 821, the Wi-Fi module 823, the BT module 825, the GPS module 827, and the NFC module 828 may be implemented with one SoC.

The RF module 829 may transmit and receive data, for example, an RF signal. Although not illustrated, the RF module 829 may include a transceiver, a power amplifier module (PAM), a frequency filter, or low noise amplifier (LNA). Also, the RF module 829 may further include the following part for transmitting and receiving an electromagnetic wave in a space in wireless communication: a conductor or a conducting wire. In FIG. 8, the illustrated embodiment is exemplified wherein the cellular module 821, the Wi-Fi module 823, the BT module 825, the GPS module 827, and the NFC module 828 are implemented to share one RF module 829. According to an alternative embodiment of the present disclosure, at least one of the cellular module 821, the Wi-Fi module 823, the BT module 825, the GPS module 827, or the NFC module 828 may transmit and receive an RF signal through a separate RF module.

The SIM card 824 may be a card that includes a subscriber identification module and may be inserted to a slot formed at a specific position of the electronic device. The SIM card 824 may include unique identify information (e.g., integrated circuit card identifier (ICCID)) or subscriber information (e.g., integrated mobile subscriber identity (IMSI)).

The memory 830 (e.g., the memory 130 illustrated in FIG. 1) may include an embedded memory 832 and/or an external memory 834. For example, the embedded memory 832 may include at least one of a volatile memory (e.g., a dynamic random access memory (DRAM), a static RAM (SRAM), or a synchronous DRAM (SDRAM)), and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

The internal memory 832 may be a solid state drive (SSD). The external memory 834 may include a flash drive, for example, compact flash (CF), secure digital (SD), micro secure digital (Micro-SD), mini secure digital (Mini-SD), extreme digital (xD) or a memory stick. The external memory 834 may be functionally connected to the electronic device 801 through various interfaces.

According to an embodiment of the present disclosure, the electronic device 801 may further include a storage device (or a storage medium), such as a hard drive.

The sensor module 840 may measure a physical quantity or may detect an operation state of the electronic device 801. The sensor module 840 may convert the measured or detected information to an electric signal. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., red, green, blue (RGB) sensor), a living body sensor 840I, a temperature/humidity sensor 840J, an illuminance sensor 840K, and/or a UV sensor 840M. Although not illustrated, the sensor module 840 may further include, for example, an E-nose sensor, an electromyography (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 840 may further include a control circuit for controlling at least one or more sensors included therein.

The input device 850 may include a touch panel 852, a (digital) pen sensor 854, a key 856, or an ultrasonic input unit 858. The touch panel 852 may recognize a touch input using at least one of capacitive, resistive, infrared and ultrasonic detecting methods. Also, the touch panel 852 may further include a control circuit. In the case of using the capacitive detecting method, a physical contact recognition or proximity recognition is allowed. The touch panel 852 may further include a tactile layer. In this case, the touch panel 852 may provide a tactile reaction to a user. The touch panel 852 may generate a touch event associated with execution of a specific function using position associated information.

The (digital) pen sensor 854 may be implemented in a similar manner as the method of receiving a touch input of a user or may be implemented using an additional sheet for recognition. The key 856 may include, for example, a physical button, an optical key, a keypad, and the like. The ultrasonic input device 858, which is an input device for generating an ultrasonic signal, may enable the electronic device 801 to detect a sound wave through a microphone (e.g., a microphone 888) so as to identify data, wherein the ultrasonic input device 858 is capable of wireless recognition.

According to an embodiment of the present disclosure, the electronic device 801 may use the communication module 820 so as to receive a user input from an external device (e.g., a computer or server) connected to the communication module 820.

The display 860 (e.g., the display 150 illustrated in FIG. 1) may include a panel 862, a hologram device 864, or a projector 866. The panel 862 may be, for example, flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. The screen may be arranged in the inside or the outside of the electronic device 801. According to an embodiment of the present disclosure, the display 860 may further include a control circuit for controlling the panel 862, the hologram device 864, and/or the projector 866.

The interface 870 may include, for example, a high-definition multimedia interface (HDMI) 872, a universal serial bus (USB) 874, an optical interface 876, and/or a D-subminiature (D-sub) 878. The interface 870 may be included, for example, in the communication interface 160 illustrated in FIG. 1. Additionally, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a portion of the audio module 880, for example, may be included in the input/output interface 140 illustrated in FIG. 1. The audio module 880 may process, for example, sound information that is input or output through a speaker 882, a receiver 884, an earphone 886, and/or a microphone 888.

According to an embodiment of the present disclosure, the camera module 891 for shooting a still image or a video may include, although not illustrated, at least one image sensor (e.g., a front sensor or a rear sensor), a lens, an image signal processor (ISP), or a flash (e.g., an LED or a xenon lamp).

The power management module 895 may manage power of the electronic device 801. Although not illustrated, a power management integrated circuit (PMIC) a charger IC, or a battery or fuel gauge may be included in the power management module 895.

The PMIC may be mounted on an integrated circuit or an SoC semiconductor. A charging method may be classified into a wired charging method and a wireless charging method. The charger IC may charge the battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, or a rectifier, and the like.

The battery gauge may measure, for example, a remaining capacity of the battery 896 and a voltage, current or temperature thereof while the battery is charged. The battery 896 may store or generate electricity, and may supply power to the electronic device 801 using the stored or generated electricity. The battery 896 may include, for example, a rechargeable battery or a solar battery.

The indicator 897 may display a specific state of the electronic device 801 or a part thereof (e.g., the AP 810), such as a booting state, a message state, a charging state, and the like. The motor 898 may convert an electrical signal into a mechanical vibration. Although not illustrated, a processing device (e.g., a GPU) for supporting a mobile TV may be included in the electronic device 801. The processing device for supporting a mobile TV may process media data according to the standards of DMB, digital video broadcasting (DVB) or media flow.

According to various embodiments of the present disclosure, an electronic device may include a camera module, a memory configured to store reference composition information, and a camera control module configured to collect real-time composition information through the camera module. The camera control module may compare the stored reference composition information and the real-time composition information to provide a user with whether the stored reference composition information and the real-time composition information are consistent with each other. The reference composition information may be predetermined by a user, a manufacturing company, or a service provider or may be extracted from a specific picture or video. The specific picture or video may be taken through the camera module or a sub camera module implemented independently of the camera module. The sub camera module may be disposed at the same surface of that of a display of the electronic device.

According to various embodiments of the present disclosure, the reference composition information may include information on a state of the electronic device or digital image information included in a specific image. The information on the state of the electronic device may include information on a movement direction, a tilt or an azimuth of a device recognized through a sensor. The digital image information may include information on brightness or chroma of a specific point of the image. The digital image information may include image information on a portion of the image. The real-time composition information may include information on a state of the electronic device or digital image information of a real-time image captured through the camera module.

According to various embodiments of the present disclosure, the camera control module may compare the real-time composition information and information on a state of the electronic device included in the reference composition information. The camera control module may compare an image associated with the reference composition information and a real-time image captured through the camera module. The camera control module may output a composition hit message or perform auto-shooting when a hit ratio of the real-time composition information to the reference composition information is greater than or equal to a reference value.

According to various embodiments of the present disclosure, the camera control module may output a composition adjustment message when a hit ratio of the real-time composition information to the reference composition information is smaller than a specific reference value. The composition adjustment message may include at least one of a voice output, a vibration adjustment output, or a flesh adjustment output. The composition adjustment message guides a user to adjust the electronic device until the hit ratio is greater than or equal to the reference value. The camera control module may replace at least a portion of a captured picture with a portion of a reference composition information based picture.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments, at least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors (e.g., the processor 120 illustrated in FIG. 1), may perform a function corresponding to the instruction. The computer-readable storage media, for example, may be the memory 130, illustrated in FIG. 1. At least a portion of the programming module, for example, may be implemented (e.g., executed) by the processor 120. At least a portion of the programming module may include the following for performing one or more functions: a module, a program, a routine, a set of instructions, or a process.

A computer-readable recording medium may include a hard disk, a magnetic media such as a floppy disk and a magnetic tape, an optical media such as compact disc Read Only Memory (CD-ROM) and a DVD, a magneto-optical media such as a floptical disk, and the following hardware devices specifically configured to store and perform a program instruction (e.g., a programming module): Read Only Memory (ROM), Random Access Memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, a computer-readable recording medium storing instructions, the instructions, when executed by at least one processor, causes the at least one processor to perform at least one operation, the at least one operation comprising storing reference composition information at a memory, collecting real-time composition information through a camera module, comparing the real-time composition information with the reference composition information, and providing whether or not of coincidence according to the comparison result.

Various embodiments of the present disclosure may allow a user to shoot a picture or a video with a required composition using composition information stored at the electronic device.

Furthermore, various embodiments of the present disclosure may allow a user to shoot a high-quality picture or video with a required composition using a plurality of camera modules included in an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a camera;
   a display;
   movement sensors configured to recognize movement of the electronic device;
   a memory configured to store reference composition information and instructions; and
   at least one processor,
   wherein the at least one processor is configured to:
     display a user interface on the display for selecting a type of composition adjustment message among a plurality of types of composition adjustment message,
     receive a user input for selecting the type of composition adjustment message via the user interface, capture a specific picture or video using the camera,
     extract real-time composition information from the specific picture or video, and the movement sensors,
     compare the stored reference composition information to the real-time composition information, and
     output the composition adjustment message of the type selected by the user input, when a hit ratio of the real-time composition information to the stored reference composition information is smaller than a reference value.

2. The electronic device of claim 1, wherein the stored reference composition information is predetermined by at least one of a user, a manufacturing company, or a service provider.

3. The electronic device of claim 1, wherein the reference composition information is extracted from another specific picture or video.

4. The electronic device of claim 3, further comprising a sub camera, the sub camera being independently implemented from the camera.

5. The electronic device of claim 4, wherein the at least one of the specific picture or video is captured using one of the camera or the sub camera.

6. The electronic device of claim 5, wherein the sub camera is disposed on the same surface as that of a display of the electronic device.

7. The electronic device of claim 1, wherein the stored reference composition information comprises at least one of information on a state of the electronic device or digital image information included in a specific image.

8. The electronic device of claim 7, wherein the information on the state of the electronic device comprises information on a movement direction, a tilt or an azimuth of the electronic device recognized through a sensor.

9. The electronic device of claim 7, wherein the digital image information comprises information on brightness or chroma of a specific point of the specific picture or video.

10. The electronic device of claim 7, wherein the digital image information comprises information on a portion of the specific picture or video.

11. The electronic device of claim 1, wherein the real-time composition information comprises at least one of information on a state of the electronic device and digital image information of the specific picture or video captured using the camera.

12. The electronic device of claim 1, wherein the at least one processor is further configured to compare information on a state of the electronic device included in the real-time composition information to information on a state of the electronic device included in the stored reference composition information.

13. The electronic device of claim 1, wherein the at least one processor is further configured to compare a picture or video associated with the stored reference composition information to the specific picture or video captured using the camera.

14. The electronic device of claim 1, wherein the at least one processor is further configured to output a composition hit message or perform auto-shooting, when a hit ratio of the real-time composition information to the stored reference composition information is greater than or equal to a reference value.

15. A shooting method executed by an electronic device having movement sensors and at least one processor, the shooting method comprising:
- displaying a user interface on a display for selecting a type of composition adjustment message among a plurality of types of composition adjustment message;
- receiving a user input for selecting the type of composition adjustment message via the user interface;
- storing reference composition information in a memory;
- capturing a specific picture or video using a camera;
- extracting, using the one or more processors, real-time composition information from the specific picture or video and the movement sensors;
- comparing the stored reference composition information to the real-time composition information; and
- outputting the composition adjustment message of the type selected by the user input, when a hit ratio of the real-time composition information to the stored reference composition information is smaller than a reference value.

16. The shooting method of claim 15, wherein the storing of the reference composition information comprises:
- extracting the reference composition information from another picture or video captured using a sub camera; and
- storing the extracted reference composition information at the memory.

17. The shooting method of claim 15,
- wherein the indicating to the user comprises outputting a composition hit message or performing auto-shooting, and
- wherein a hit ratio of the real-time composition information compared to the reference composition information is greater than or equal to a specific reference value.

* * * * *